United States Patent
Gomez Ramirez et al.

(10) Patent No.: US 12,337,748 B2
(45) Date of Patent: Jun. 24, 2025

(54) AUTOMOTIVE LIGHTING DEVICE WITH LEVELLER HAVING A LEVELLER ACTUATOR CONNECTED TO A BALL SOCKET CONNECTION OF LIGHTING MODULE

(71) Applicant: VALEO VISION, Bobigny (FR)

(72) Inventors: Manuel Gomez Ramirez, Bobigny (FR); Jose Manuel Rios Zorrilla, Bobigny (FR); Juan Manuel Gallego Extremera, Bobigny (FR); Guillermo Fernandez-España Romero, Bobigny (FR); Jose Miguel Vargas Rizquez, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/708,080

(22) PCT Filed: Nov. 9, 2022

(86) PCT No.: PCT/EP2022/081349
§ 371 (c)(1),
(2) Date: May 7, 2024

(87) PCT Pub. No.: WO2023/083903
PCT Pub. Date: May 19, 2023

(65) Prior Publication Data
US 2025/0018856 A1    Jan. 16, 2025

(30) Foreign Application Priority Data
Nov. 9, 2021   (FR) ...................................... 2111850

(51) Int. Cl.
*B60Q 1/04*   (2006.01)
*B60Q 1/00*   (2006.01)
*B60Q 1/068*  (2006.01)

(52) U.S. Cl.
CPC .......... *B60Q 1/045* (2013.01); *B60Q 1/0035* (2013.01); *B60Q 1/0088* (2013.01);
(Continued)

(58) Field of Classification Search
CPC ..... B60Q 1/068; B60Q 1/045; B60Q 2200/32
See application file for complete search history.

(56) References Cited

U.S. PATENT DOCUMENTS

2016/0372233 A1   12/2016   Faoucher et al.

FOREIGN PATENT DOCUMENTS

| DE | 10 2009 030 352 A1 | 1/2011 |
|---|---|---|
| DE | 10 2012 022 082 A1 | 5/2014 |

(Continued)

OTHER PUBLICATIONS

International Search Report issued Jan. 2, 2023 in PCT/EP2022/081349, filed on Nov. 9, 2022, 4 pages.

*Primary Examiner* — Robert J May
(74) *Attorney, Agent, or Firm* — Oblon, McClelland, Maier & Neustadt, L.L.P.

(57) ABSTRACT

An automotive lighting device includes a housing, a lighting module arranged inside the housing and a leveler having a leveler motor and a leveler actuator. The lighting module includes a ball socket connection suitable to receive a leveler actuator connector, the lighting module defining a light projection direction. The leveler actuator includes a connector configured to couple with the ball socket connection. The leveler is arranged totally inside the housing and the leveler actuator is arranged to push the ball socket connection in a direction which forms between 150 and 210° with respect to the light projection direction.

18 Claims, 5 Drawing Sheets

(52) U.S. Cl.
CPC ........... *B60Q 1/0441* (2013.01); *B60Q 1/068* (2013.01); *B60Q 2200/32* (2013.01)

(56) References Cited

FOREIGN PATENT DOCUMENTS

| | | |
|---|---|---|
| DE | 10 2020 108 715 A1 | 9/2021 |
| EP | 588725 A1 * | 3/1994 ............ B60Q 1/076 |
| EP | 2 213 513 A1 | 8/2010 |
| EP | 3 647 114 A1 | 5/2020 |
| EP | 3 653 436 B1 | 7/2021 |
| FR | 2 812 375 A3 | 2/2002 |
| JP | 2005-123257 A | 5/2005 |
| WO | WO 2022/184588 A1 | 9/2022 |

\* cited by examiner

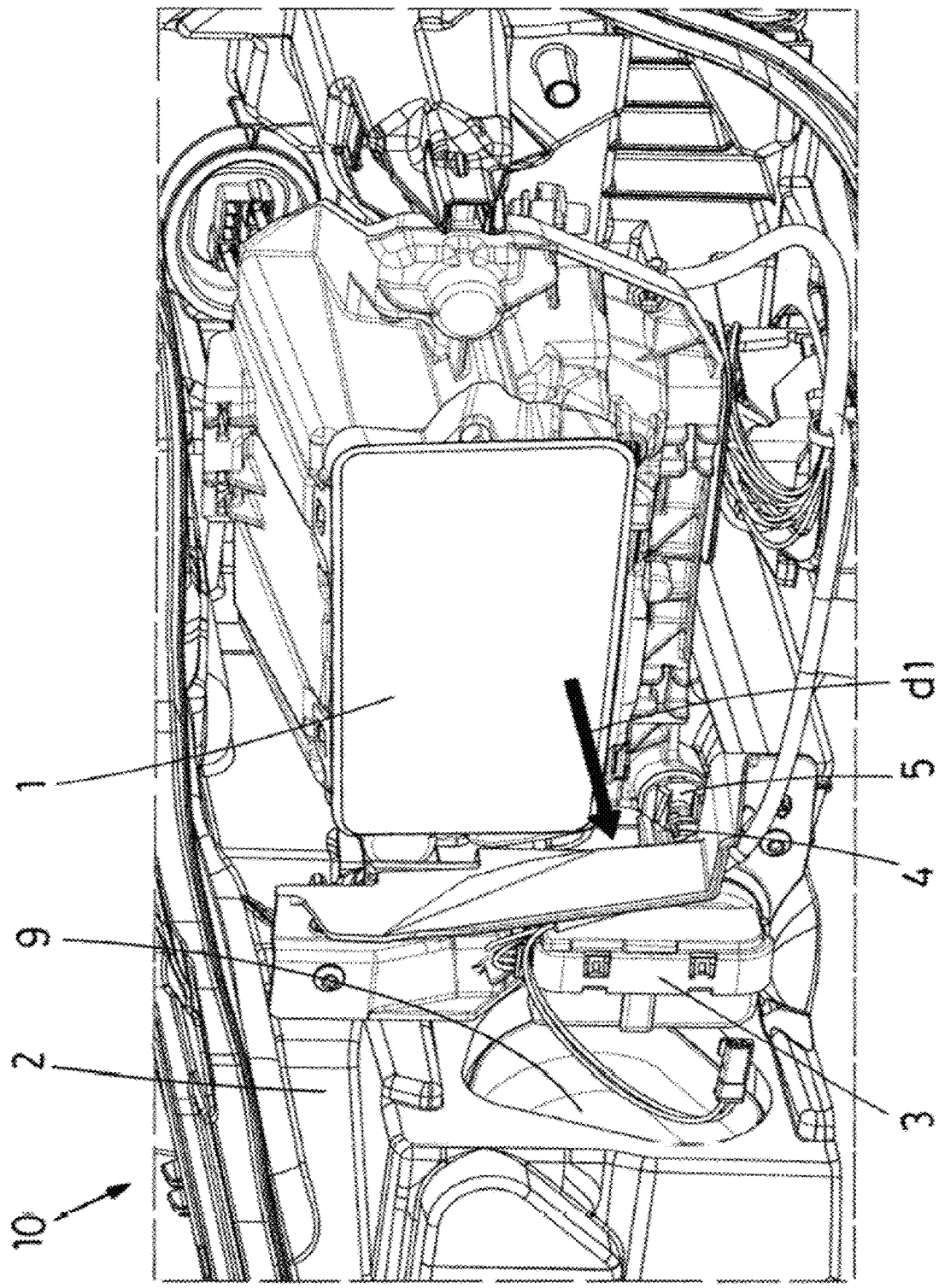

[Fig. 2]
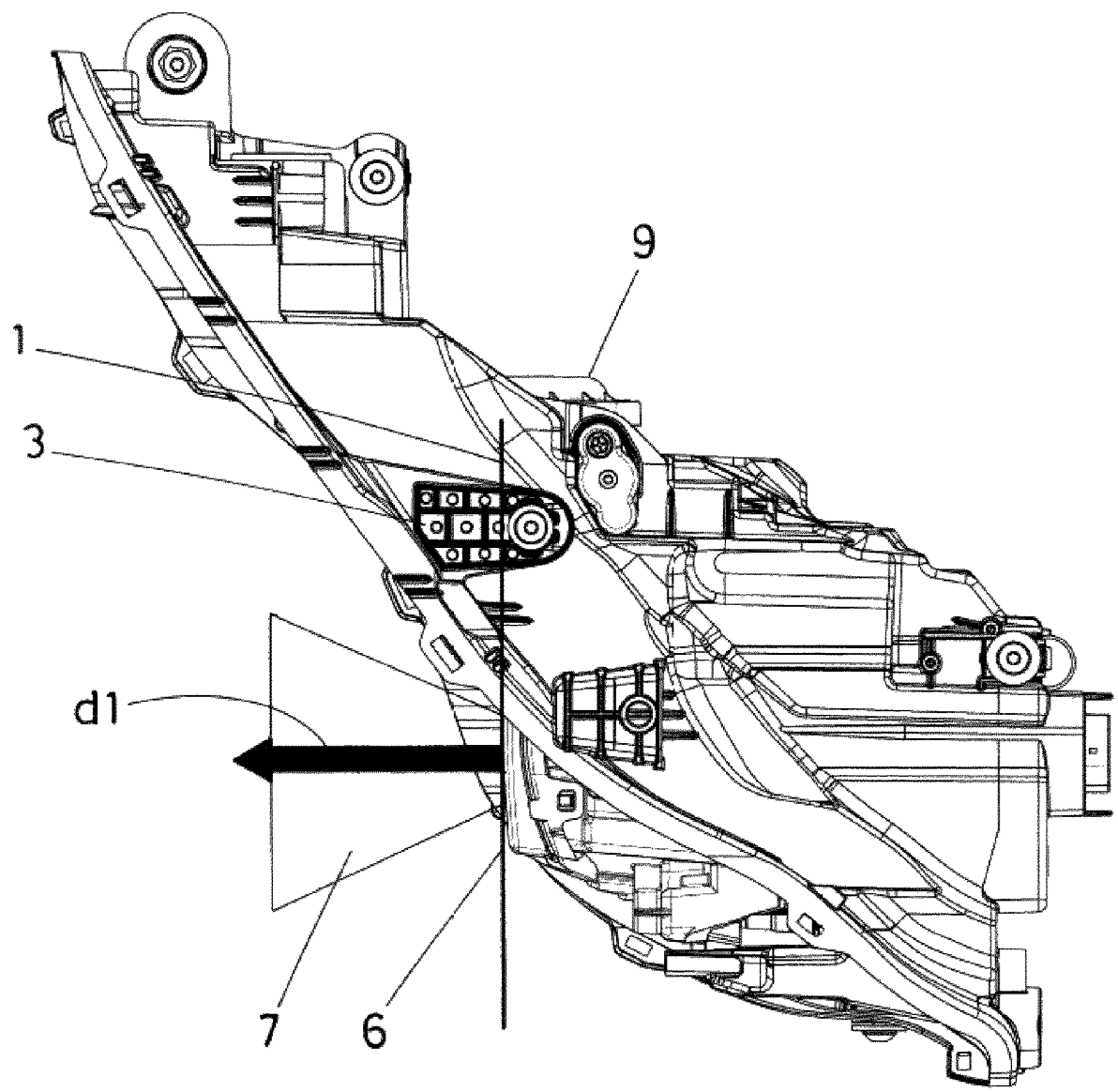

[Fig. 3]
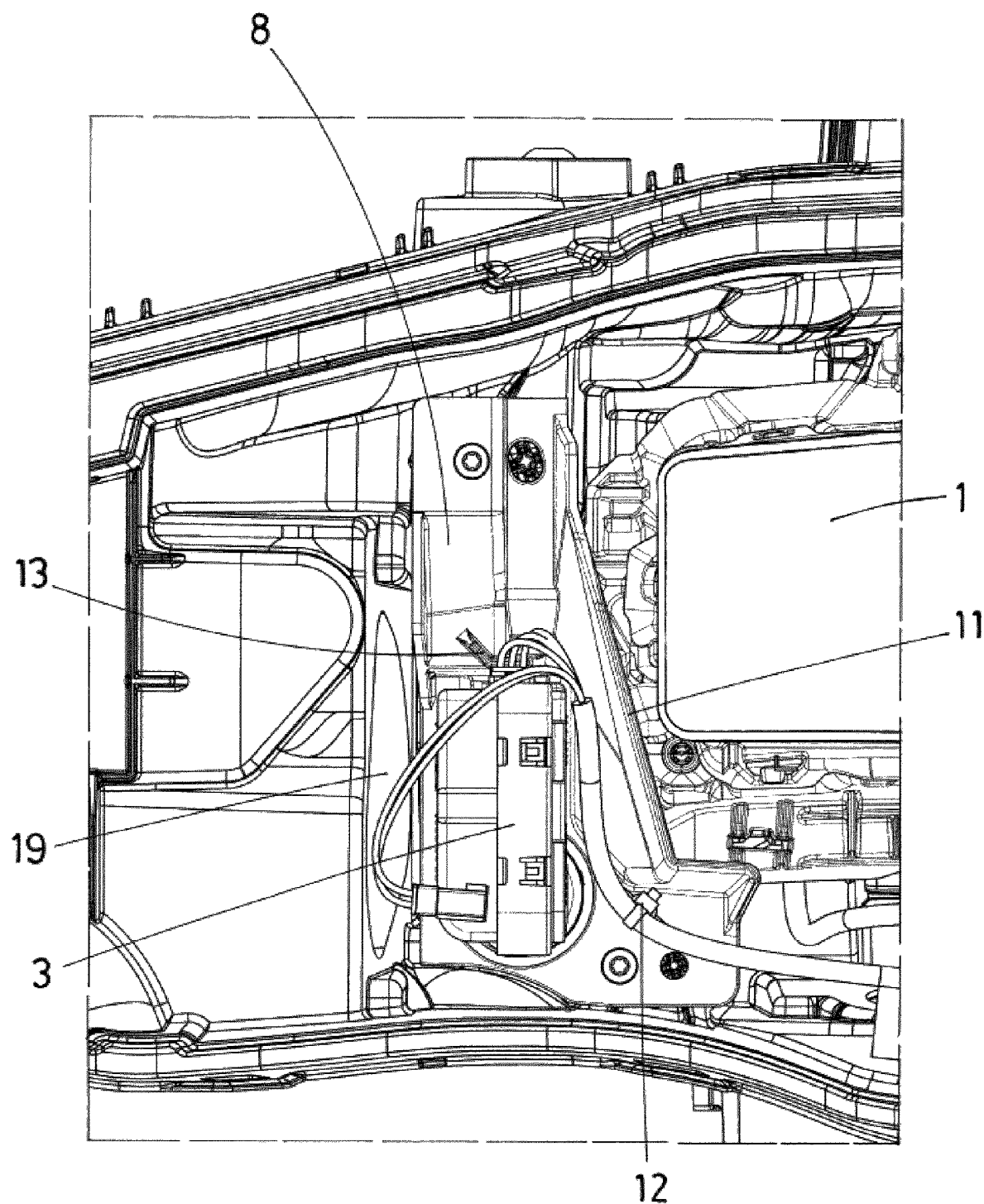

[Fig. 4]
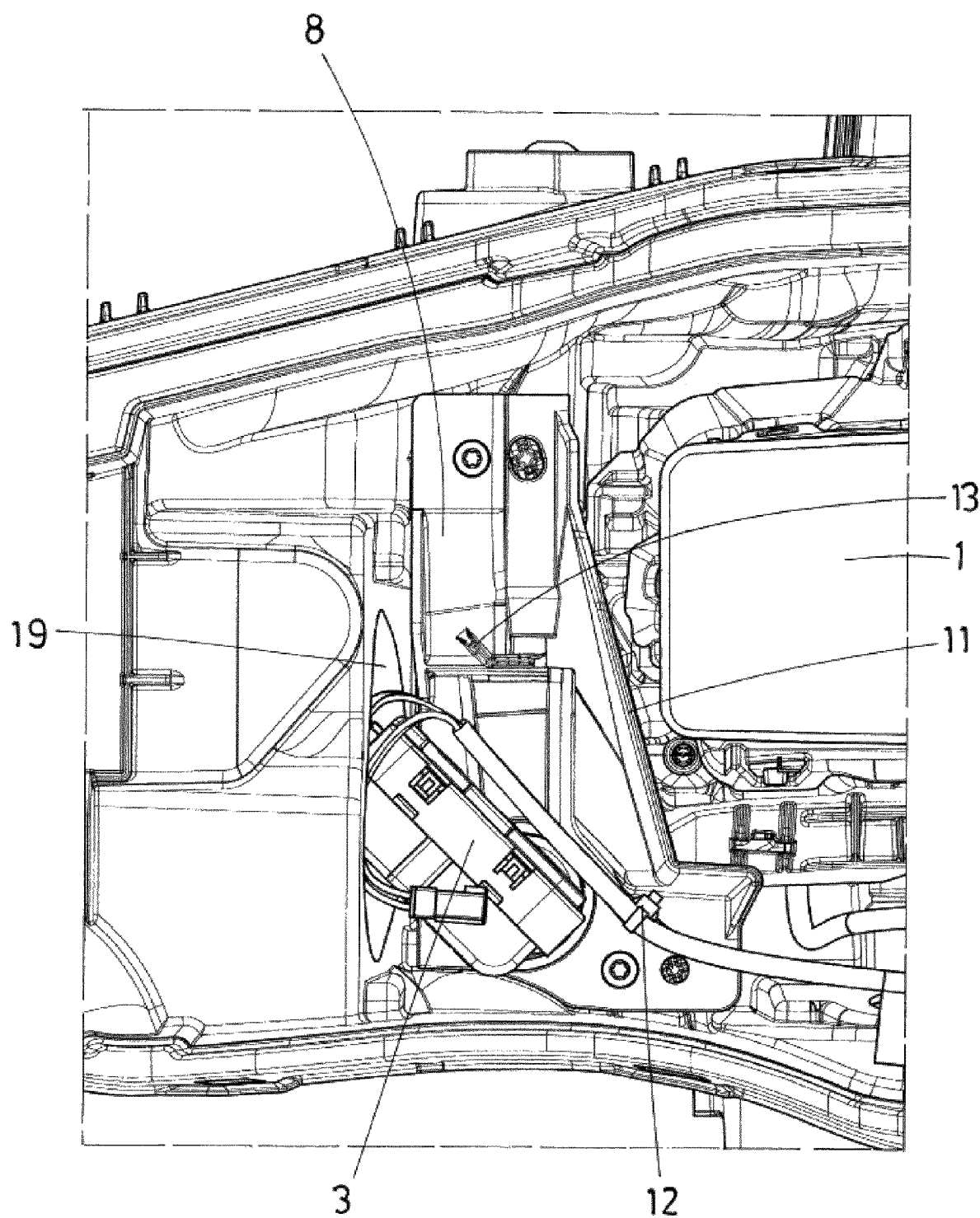

[Fig. 5]
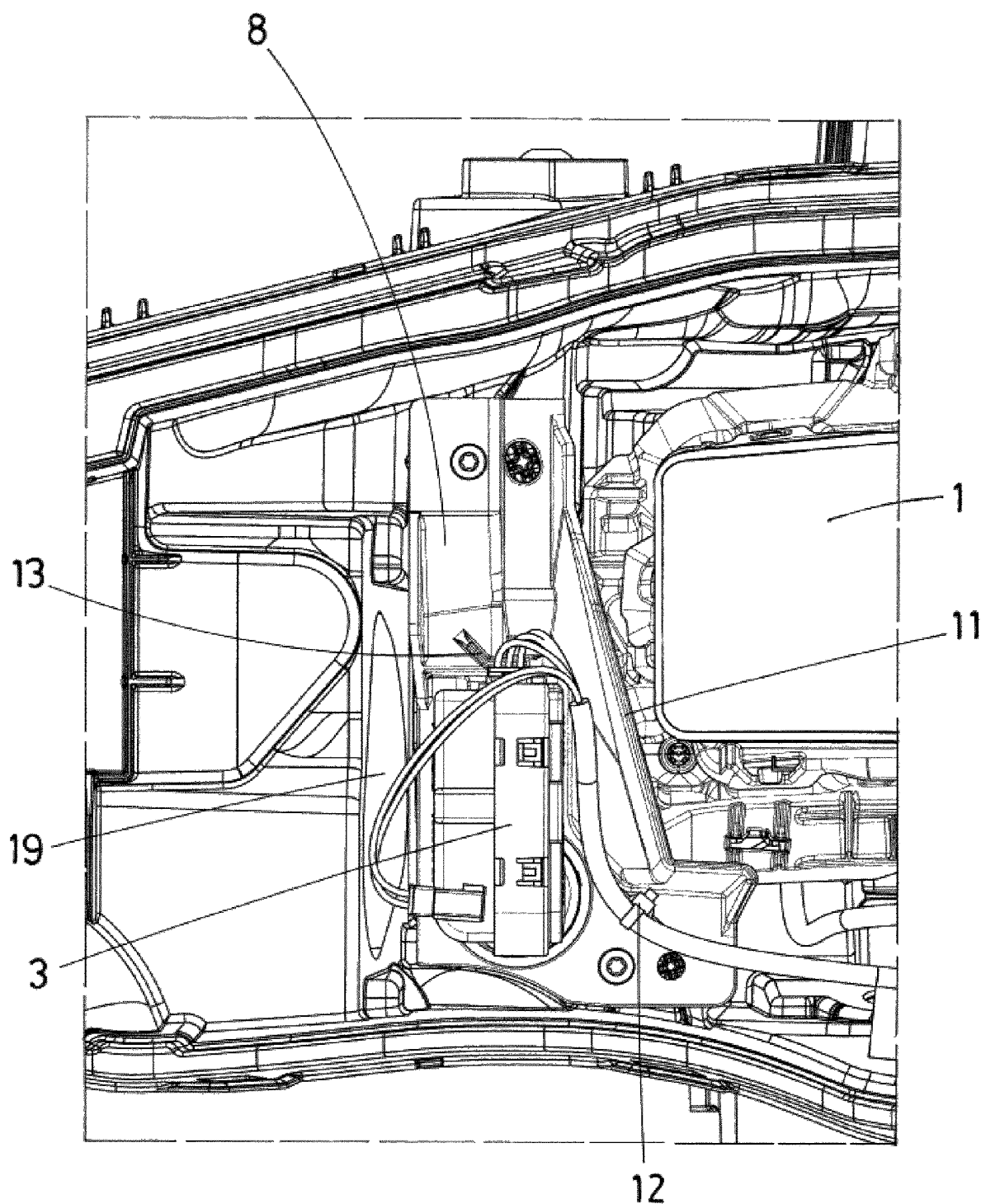

AUTOMOTIVE LIGHTING DEVICE WITH LEVELLER HAVING A LEVELLER ACTUATOR CONNECTED TO A BALL SOCKET CONNECTION OF LIGHTING MODULE

This invention belongs to the field of the optical solutions for projecting light emitted by light sources of automotive luminous device outside said luminous devices.

Automotive lighting market can be considered one of the most competitive ones and new lighting functionalities are constantly required.

This technical development affects basic arrangements in the lighting device, such as levelling. In some cases, digital levelling may be performed in more top-tier devices, but low-range devices still trust on mechanical levelers.

Lately, the position and operation of these levelers are affected by modern shapes and functionalities, and it is sometimes difficult to arrange a leveler in the space where it is intended to be placed.

However, the position of a leveler is well studied, since it must cooperate with its functionality, which requires an easy access to the ball socket joint of the lighting module to be adjusted.

A way of improving the size of the leveler, or at least its impact on the internal room of the headlamp, would be desirable to solve this problem.

The present invention provides a solution for this problem by means of an automotive lighting device comprising
   a housing;
   a lighting module arranged inside the housing, the lighting module comprising a ball socket connection suitable to receive a leveler actuator connector, the lighting module defining a light projection direction; and
   a leveler comprising a leveler motor and a leveler actuator, wherein the leveler actuator comprises a connector configured to couple with the ball socket connection;
   wherein the leveler is arranged totally inside the housing and wherein the leveler actuator is arranged to push the ball socket connection in a pushing direction which forms between 150 and 210° with respect to the light projection direction.

The position of the leveler and the orientation of the pushing direction eases the assembly process and reduces the room needed by the lighting device in the rear part, which is usually critical. Further, it also eases the access to the leveler in the event it needs to be repaired or replaced.

In some particular embodiments,
   the lighting module defines a front plane, which is perpendicular to the light projection direction and is tangent to the lighting module in the light exit surface of the lighting module;
   the lighting module defines a lighted zone, which comprises all the points that receive at least one light ray from the lighting module; and
   the leveler is located outside the lighted zone.

A zone which is beside the lighting module is usually emptier than the back of the lighting device. The leveler does not interfere with the luminous functionality of the lighting module, since it is outside the light cone.

In some particular embodiments, the leveler motor is located at the same side of the front plane as the lighted zone.

The front plane defines two halves: at one side, that is to say in front of when considering the lighting module in operation, the plane and at the other side, that is to say behind when considering the lighting module in operation, of the plane. Some particular embodiments arrange the leveler motor in the front half of the lighting device, but outside the light cone. This space is usually emptier, and the leveler may act on the leveler connector from the front of the housing.

In some particular embodiments, the automotive lighting device further comprises a bezel arranged to cover the leveler.

The car manufacturer does not usually want that the leveler is visible from outside the lighting device, so a bezel is a good option to cover this part.

In some particular embodiments, the housing further comprises a lateral cap for accessing the leveler.

Since the leveler is not located in the back part of the lighting device, it is easy to place a cap in a lateral side of the housing to access the leveler. In fact, due to the fact that the leveler is completely inside the housing volume, this cap can be flat.

In some particular embodiments, the connector configured to couple with the ball socket connection comprises a ball connection, the automotive lighting device being configured such that the ball connection allows a rotation in a plane perpendicular to the pushing direction, thus enabling the leveler actuator to be installed in an angle which is not the final angle.

In some particular embodiments, the leveler motor has an electrical connector, the automotive lighting device bring arranged such that once this electrical connector is connected thereto, the leveler actuator, which is already coupled to the ball socket connection, is rotated, to reach its final position, notably a final upright position.

In some particular embodiments, the automotive lighting device further comprises a leveler support attached to the housing, wherein the leveler is attached to the leveler support.

A separate leveler support includes all the necessary elements to fix the leveler and its components. Thus, it is easier to design and apply the mould of the housing, since there is no need to provide a special support portion for the leveler.

In some particular embodiments, the leveler support comprises a bezel portion, which is seen from the exterior of the lighting device when the lighting device is in operation.

This support may contribute with a main part, providing a portion of bezel to cover the leveler and the internal cables of the lighting device.

In some particular embodiments, the leveler support comprises a harness guide, configured to retain and/or guide a harness of wires.

Normally, there are many harnesses inside the housing, due to the increasingly high number of electronic elements to be electrically fed and controlled. Since the leveler support is an additional element which is located in the middle of the housing, this is an advantageous location to place a harness guide.

In some particular embodiments, the leveler motor has an electrical connector connected thereto and the leveler support comprises a tab arranged to retain the electrical connector connected to the leveler motor.

The leveler motor receives electric supply from an electrical connector. This connector is coupled into the leveler motor in the manufacturing process. The tab of the leveler support ensures that the connector is kept in place.

In some particular embodiments, the automotive lighting device is arranged such that when the final position is reached, the electric connector abuts with a tab present in the leveler support. This tab can be the said tab arranged to retain the electrical connector connected to the leveler motor.

In some particular embodiments, the lighting module comprises at least one solid-state light source.

The term "solid-state light source" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In some particular embodiments, the lighting module further comprises an optical element, such as a light filter or a collimator, adapted to receive the light emitted by the solid-state light source and project it outside the lighting module.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

The previously described particular embodiments might be combined.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a general view of an automotive headlamp according to the invention.

FIG. 2 shows the position of the leveler in an automotive headlamp according to the invention.

FIG. 3 shows some features of a leveler support part comprised in the automotive headlamp of the invention.

FIG. 4 and FIG. 5 show some manufacturing steps in the installation of the leveler in the automotive headlamp of the invention.

In these figures, the following reference numbers are used for each of the following elements:
1 Lighting module
2 Housing
3 Leveler motor
4 Leveler actuator
5 Ball socket joint
6 Front plane
7 Lighted zone
8 Leveler support part
9 Lateral cap
10 Headlamp
11 Bezel portion
12 Harness guide
13 Tab
19 Access hole The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general view of an automotive headlamp 10 according to the invention. In this figure, there are some elements which can be observed.

Firstly, this automotive headlamp comprises a housing 2 and a lighting module 1 arranged inside the housing 2. This lighting module is arranged to project light in a light projection direction d1.

The orientation of this lighting module 1 may be adjusted by means of a leveler. The leveler comprises a leveler motor 3 which is configured to move a leveler actuator 4, which is a shaft with a ball connection at its end. To create a suitable interaction between the leveler and the lighting module, the lighting module comprises a ball socket joint 5 adapted to receive the ball of the leveler actuator.

The use of a ball socket connection to receive the ball of the leveler shaft is not new in the field of lighting module levelers. The contribution of this invention is the relative location of the leveler with respect to the light module.

In this invention, the leveler is arranged totally inside the housing 2 and the leveler actuator 4 is arranged to push (i.e., to move towards) the ball socket connection in a direction which forms about 180° with respect to the light projection direction d1. In this case, the leveler pushes the ball socket joint of the lighting module from the front of the module, instead of the known solutions, which pushes from behind. This is the meaning of the 180° that form the pushing direction with respect to the light projection direction. In some cases, this angle may not be as exact as 180°, and may be comprised between 150° and 210°.

The position of the leveler motor 3, which is the bulkiest element of the leveler, inside the housing 2 is not only in front of the lighting module 1, but also at one side. This is explained in FIG. 2. In this figure, a front plane 6 is drawn. This front plane is perpendicular to the light projection direction and tangent to the lighting module in the light exit surface of the lighting module, which in this case is the front surface of the lens of the lighting module. Further to this plane, a lighted zone is also shown. This lighted zone 7 corresponds to the zone which receives light from the lighting module. Simplifying, the lighted zone is located at one side (the front side) of the front plane, while the lighting module is located at the other side (the back side) of the front plane.

The position of the leveler motor 3 is in the same side of the front plane as the lighted zone, but outside this lighted zone 7. The front plane 6 divides the housing space into two (at one side and at the other side), but the front side is not totally covered with light, since the light emitted by the lighting module does not fully cover all the front side of the front plane. The leveler motor 3 is therefore located in front of the lighting module, but laterally displaced. The set is closed by a lateral cap 9, which is intended to close the access to replace the leveler if necessary.

FIG. 3 is focused on the separate leveler support part 8, which is designed to attach the leveler to the housing 2. The leveler is not directly attached to the housing 2, but to this leveler support part 8, which is installed on the housing after demoulding the housing element. Therefore, the moulding process is easier and more reliable.

Concerning this separate leveler support part 8, it has some design details which are also advantageous in the operation of the headlamp.

First one is a bezel portion 11, which is intended to cover the leveler motor 3, so that it is not visible from outside the headlamp 10 when it is installed in an automotive vehicle. This bezel portion cooperates with the rest of the bezel (which is not shown in this figure because it would hide the leveler support) in providing a suitable light path and a suitable cover of the internal elements of the headlamp.

In this figure, the access hole 19 designed to be closed by the cap is also seen. This is very useful for directly accessing the leveler from one lateral side of the housing, instead of accessing from behind, which is the usual arrangement of the known levelers. Further, since the leveler is located inside the housing, this cover is flat, since it does not need to include the leveler motor or at least a portion of it.

Further to the other advantages, the leveler support comprises a harness guide 12, configured to retain and/or guide a harness of wires. This is particularly interesting taking into account the increasingly high number of wires and cables that are present in the interior of a headlamp.

FIG. 4 shows some specific steps of the manufacturing process, which is also useful to show another feature of the leveler support part.

The leveler actuator comprises a ball connection, which is configured to be coupled to the ball socket of the lighting module. This ball connection allows a rotation in a plane perpendicular to the actuator direction, or pushing direction, thus enabling the leveler to be installed in an angle which is not the final angle.

This is used for an easy coupling of the electric connector. The leveler, as shown in this FIG. 4, is installed in a biased position, tilted from the final upright position. This tilted position is shown in FIG. 4. In this tilted position, the attachment of the electric connection is easy, since the tilted position provides an easy access to the electric connection.

Once this electric connection has been established, the leveler, which is already coupled to the ball socket joint of the lighting module, is rotated, to reach its final upright position. This position is shown in FIG. 5. When this final position is reached, the electric connector abuts with a tab 13 present in the leveler support 8. This tab 13 ensures that the electric connector remains in its correct place, once the leveler is located in its final position.

The invention claimed is:

1. An automotive lighting device comprising
a housing;
a lighting module arranged inside the housing, the lighting module comprising a ball socket connection suitable to receive a leveller actuator connector, the lighting module defining a light projection direction;
a leveller comprising a leveller motor and a leveller actuator, wherein the leveller actuator comprises a connector configured to couple with the ball socket connection; and
wherein the leveller is arranged totally inside the housing and wherein the leveller actuator is arranged to push the ball socket connection in a pushing direction which forms between 150° and 210° with respect to the light projection direction,
wherein the connector configured to couple with the ball socket connection comprises a ball connection, the automotive lighting device being configured such that the ball connection is configured to allow a rotation of the leveller in a plane perpendicular to the pushing direction, enabling the leveller actuator to be installed in a non-horizontal biased position, tilted from a final upright position, in an angle that is not a final position, and
wherein the leveller motor includes an electrical connector, the automotive lighting device being arranged such that once the electrical connector is connected thereto, the leveller, which is coupled to the ball socket connection through the leveller actuator, is configured to rotate to reach the final upright position.

2. The automotive lighting device according to claim 1, wherein
the lighting module defines a front plane, which is perpendicular to the light projection direction and is tangent to the lighting module in the light exit surface of the lighting module;
the lighting module defines a lighted zone, which comprises all the points that receive at least one light ray from the lighting module; and
the leveller is located outside the lighted zone.

3. The automotive lighting device according to claim 2, wherein the leveller motor is located at the same side of the front plane as the lighted zone.

4. The automotive lighting device according to claim 2, further comprising a bezel arranged to cover the leveller.

5. The automotive lighting device according to claim 2, wherein the housing further comprises a lateral cap for accessing the leveller.

6. The automotive lighting device according to claim 2, wherein the connector configured to couple with the ball socket connection comprises a ball connection, the automotive lighting device being configured such that the ball connection allows a rotation in a plane perpendicular to the pushing direction, thus enabling the leveller actuator to be installed in an angle which is not a final angle.

7. The automotive lighting device according to claim 2, further comprising a leveller support attached to the housing, wherein the leveller is attached to the leveller support.

8. The automotive lighting device according to claim 1, further comprising a bezel arranged to cover the leveller.

9. The automotive lighting device according to claim 1, wherein the housing further comprises a lateral cap for accessing the leveller.

10. The automotive lighting device according to claim 1, further comprising a leveller support attached to the housing, wherein the leveller is attached to the leveller support.

11. The automotive lighting device according to claim 10, wherein the leveller support comprises a bezel portion, which is seen from the exterior of the lighting device when the lighting device is in operation.

12. The automotive lighting device according to claim 11, wherein the leveller support comprises a harness guide, configured to retain and/or guide a harness of wires.

13. The automotive lighting device according to claim 11, wherein the leveller motor has an electrical connector connected thereto and the leveller support comprises a tab arranged to retain the electrical connector connected to the leveller motor.

14. The automotive lighting device according to claim 10, wherein the leveller support comprises a harness guide, configured to retain and/or guide a harness of wires.

15. The automotive lighting device according to claim 10, wherein the leveller motor has an electrical connector connected thereto and the leveller support comprises a tab arranged to retain the electrical connector connected to the leveller motor.

16. The automotive lighting device according to claim 15, wherein the tab with which the connector abuts when the final position is reached is the tab arranged to retain the electrical connector connected to the leveller motor.

17. The automotive lighting device according to claim 1, wherein the automotive lighting device is arranged such that when the final position is reached, the electric connector abuts with a tab present in the leveller support.

18. The automotive lighting device according to claim 1, wherein the lighting module comprises at least one solid-state light source.

* * * * *